United States Patent
Zhao

(10) Patent No.: US 9,078,282 B2
(45) Date of Patent: Jul. 7, 2015

(54) METHOD AND APPARATUS FOR IMPLEMENTING NETWORK DEVICE FUNCTION OF WIRELESS COMMUNICATION TERMINAL

(75) Inventor: Ming Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 423 days.

(21) Appl. No.: 13/580,545

(22) PCT Filed: Sep. 21, 2010

(86) PCT No.: PCT/CN2010/077208
§ 371 (c)(1),
(2), (4) Date: Aug. 22, 2012

(87) PCT Pub. No.: WO2012/019376
PCT Pub. Date: Feb. 16, 2012

(65) Prior Publication Data
US 2012/0317263 A1     Dec. 13, 2012

(30) Foreign Application Priority Data
Aug. 11, 2010 (CN) .......................... 2010 1 0251163

(51) Int. Cl.
*H04W 24/00* (2009.01)
*G06F 15/173* (2006.01)
(Continued)

(52) U.S. Cl.
CPC .............. *H04W 88/06* (2013.01); *H04W 88/02* (2013.01)

(58) Field of Classification Search
CPC ... H04L 15/5835; H04L 12/282; H04L 51/12; H04L 67/2923; H04M 1/6066; G06F 13/385; G06F 13/387; H04W 88/02
USPC ............ 709/206, 217, 223, 228–230; 710/16, 710/710, 315, 316; 713/300
See application file for complete search history.

(56) References Cited

U.S. PATENT DOCUMENTS 6,785,730 B1 *   8/2004 Taylor ........................... 709/230
2003/0097488 A1 *   5/2003 Bauman et al. ............... 709/328
(Continued)

FOREIGN PATENT DOCUMENTS

CN         1690946 A     11/2005
CN       101588378 A     11/2009
(Continued)

OTHER PUBLICATIONS
International Search Report in international application No. PCT/CN2010/077208, mailed on May 19, 2011.
(Continued)

*Primary Examiner* — Wing F Chan
*Assistant Examiner* — Raji Krishnan
(74) *Attorney, Agent, or Firm* — Oppedahl Patent Law Firm LLC

(57) ABSTRACT

The disclosure provides a method and an apparatus for implementing a network device function of a wireless communication terminal, belonging to the field of communications. The method for implementing a network device function of a wireless communication terminal includes: the apparatus for implementing the network device function of the wireless communication terminal receives a control instruction and determines a sender of the control instruction; when the sender of the control instruction is a host, the apparatus for implementing the network device function of the wireless communication terminal forwards the received control instruction to the wireless communication terminal; and, when the sender of the control instruction is the wireless communication terminal, the apparatus for implementing the network device function of the wireless communication terminal forwards the received control instruction to the host. The technical solution can implement a network data exchange with the wireless communication terminal on a non-windows platform.

6 Claims, 3 Drawing Sheets

(51) Int. Cl.
*H04W 88/06* (2009.01)
*H04W 88/02* (2009.01)

(56) References Cited

U.S. PATENT DOCUMENTS

| | | |
|---|---|---|
| 2005/0114558 A1 | 5/2005 | Nian |
| 2007/0287493 A1* | 12/2007 | Stephens .................... 455/550.1 |
| 2008/0084897 A1* | 4/2008 | Na et al. ......................... 370/493 |
| 2009/0003585 A1* | 1/2009 | Chen et al. .................... 379/268 |
| 2010/0077235 A1* | 3/2010 | Lee et al. ...................... 713/300 |
| 2010/0180063 A1* | 7/2010 | Ananny et al. ................ 710/315 |

FOREIGN PATENT DOCUMENTS

| | | |
|---|---|---|
| CN | 101729557 A | 6/2010 |
| CN | 101739364 A | 6/2010 |
| CN | 101764695 A | 6/2010 |
| EP | 2386959 A1 | 11/2011 |

OTHER PUBLICATIONS

English Translation of the Written Opinion of the International Search Authority in international application No. PCT/CN2010/077208, mailed on May 19, 2011.

* cited by examiner

METHOD AND APPARATUS FOR IMPLEMENTING NETWORK DEVICE FUNCTION OF WIRELESS COMMUNICATION TERMINAL

TECHNICAL FIELD

The present disclosure relates to the field of communications, in particular to a method and an apparatus for implementing a network device function of a wireless communication terminal.

BACKGROUND

At present, with the rapid development of a 3 G communication network, a user not only has a high requirement on a conventional voice service of a mobile network, but also pays more and more attention to a wireless data service of the mobile network. Accordingly, a 3G data card is also very widely applied. A conventional data card exchanges data with a network in two states: one is that the data card is simulated into a modem, and the other is that the data card is simulated into a network device.

Due to the advantages of a network device in bandwidth and load, the second state, i.e., a data card is simulated into a network device, is becoming the mainstream use of the data card. However, now, such state is only available on the windows platform of the Microsoft corporation but unavailable on a non-windows platform, such as desktop Linux and embedded Linux. The reason is that the non-windows platform cannot provide a mechanism for exchanging network data with the data card.

SUMMARY

The technical problem to be solved by the disclosure is to provide a method and an apparatus for implementing a network device function of a wireless communication terminal, which can implement network data exchange with the wireless communication terminal on a non-windows platform.

In order to solve the technical problem, embodiments of the disclosure provide technical solutions as follows.

In one aspect, a method for implementing a network device function of a wireless communication terminal is provided, including:

receiving a control instruction and determining a sender of the control instruction by an apparatus for implementing the network device function of the wireless communication terminal;

when the sender of the control instruction is a host, then forwarding the received control instruction to the wireless communication terminal by the apparatus for implementing the network device function of the wireless communication terminal; and when the sender of the control instruction is the wireless communication terminal, then forwarding the received control instruction to the host by the apparatus for implementing the network device function of the wireless communication terminal.

Furthermore, the step of receiving a control instruction and determining a sender of the control instruction by an apparatus for implementing the network device function of the wireless communication terminal may include:

receiving a request message by socket which includes the control instruction and the sender of the control instruction, and determining the sender of the control instruction according to the request message by socket by the apparatus for implementing the network device function of the wireless communication terminal.

Furthermore, the step of forwarding the received control instruction to the wireless communication terminal by the apparatus for implementing the network device function of the wireless communication terminal may include:

encapsulating the received control instruction into a predetermined instruction format by the apparatus for implementing the network device function of the wireless communication terminal; and sending the encapsulated control instruction to the wireless communication terminal by the apparatus for implementing the network device function of the wireless communication terminal through a first interface of the apparatus itself.

Furthermore, the step of forwarding the received control instruction to the host by the apparatus for implementing the network device function of the wireless communication terminal may include:

encapsulating the received control instruction into a predetermined instruction format by the apparatus for implementing the network device function of the wireless communication terminal; and sending the encapsulated control instruction to the host by the apparatus for implementing the network device function of the wireless communication terminal through a second interface of the apparatus itself.

Furthermore, the predetermined instruction format may include but may be not limited to: an instruction format in a communication-class sub-protocol in a Universal Serial Bus (USB) protocol, or an instruction format in a Qualcomm Modem Interface (QMI) specification.

An embodiment of the disclosure further provides an apparatus for implementing a network device function of a wireless communication terminal, including:

an interface module which is configured to receive and send a control instruction; and a processing module which is configured to determine a sender of the control instruction received by the interface module; forward the received control instruction to the wireless communication terminal through the interface module when the sender of the control instruction is a host; forward the received control instruction to the host through the interface module when the sender of the control instruction is the wireless communication terminal.

The interface module may be specifically configured to receive a request message by socket, which includes the control instruction and the sender of the control instruction; and the processing module may be specifically configured to determine the sender of the control instruction according to the sender of the control instruction included in the request message by socket.

The interface module may include:

a first interface module which is configured to forward a control signalling between the processing module and the wireless communication terminal; and a second interface module which is configured to forward a control signalling between the processing module and the host.

The processing module may be further configured to encapsulate the control instruction received by the interface module into a predetermined instruction format, which includes but is not limited to: an instruction format in a communication-class sub-protocol in a Universal Serial Bus (USB) protocol, or an instruction format in a Qualcomm Modem Interface (QMI) specification.

The processing module may be specifically configured to send the encapsulated control instruction to the first interface module after determining that the sender of the control instruction is the host, so as to enable the first interface module to send the encapsulated control instruction to the wireless communication terminal; and send the encapsulated control instruction to the second interface module after determining that the sender of the control instruction is the wireless communication terminal, so as to enable the second interface module to send the encapsulated control instruction to the host.

The technical solution of the disclosure has the following beneficial effects:

In the above solution, the apparatus for implementing a network device function of a wireless communication terminal can implement the information exchange between the wireless communication terminal and a host on a non-windows platform, as a result, the problem that the network device function of the wireless communication terminal is not available on the non-windows platform is solved, and a user can freely use the network device function of the wireless communication terminal in different operating system environments.

DETAILED DESCRIPTION

For clearer description of the technical problem to be solved, technical solution and advantages of the embodiments of the disclosure, the disclosure will be described below in detail in conjunction with the drawings and embodiments.

To solve the problem that a non-windows platform cannot provide a mechanism for exchanging network data with a wireless communication terminal in the related art, the embodiments of the disclosure provides a method and an apparatus for implementing a network device function of a wireless communication terminal, which can implement the network data exchange with the wireless communication terminal on the non-windows platform.

Figure 1:
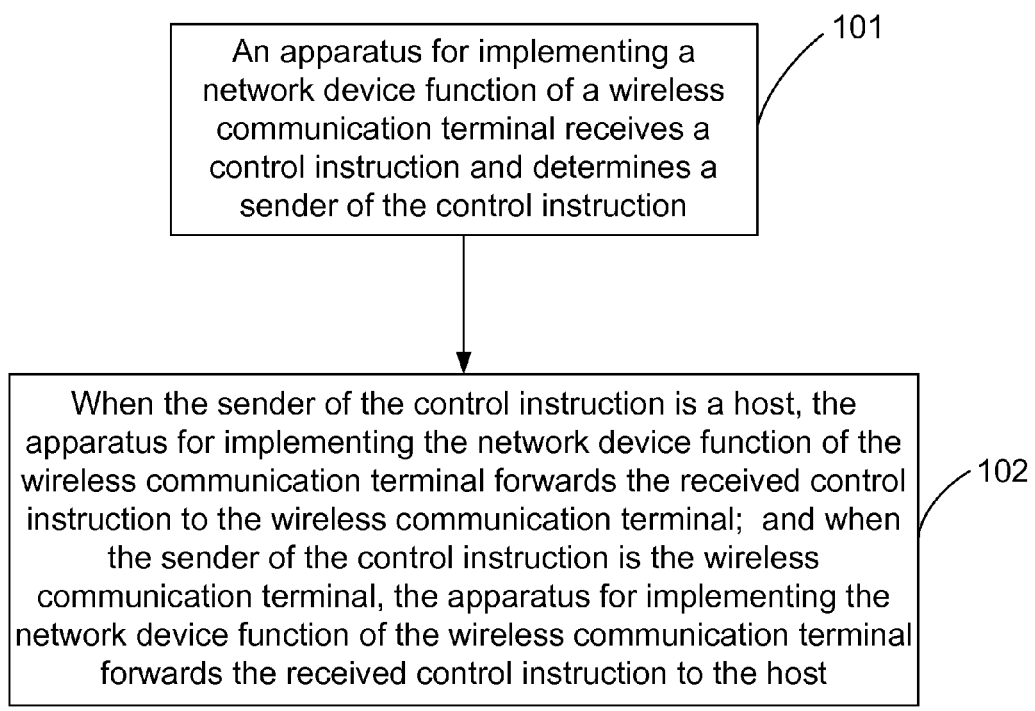
FIG. 1 is a diagram showing a flow of a method for implementing a network device function of a wireless communication terminal in one embodiment of the disclosure.

FIG. 1 is a diagram showing a flow of a method for implementing a network device function of a wireless communication terminal in one embodiment of the disclosure, as shown in FIG. 1, the embodiment includes:

Step 101: an apparatus for implementing the network device function of the wireless communication terminal receives a control instruction and determines a sender of the control instruction.

Step 102: when the sender of the control instruction is a host, the apparatus for implementing the network device function of the wireless communication terminal forwards the received control instruction to the wireless communication terminal; and when the sender of the control instruction is the wireless communication terminal, the apparatus for implementing the network device function of the wireless communication terminal forwards the received control instruction to the host.

The method for implementing a network device function of a wireless communication terminal in the embodiment can implement the information exchange between the wireless communication terminal and the host on a non-windows platform, as a result, the problem that the network device function of the wireless communication terminal is not available on the non-windows platform is solved, and a user can freely use the network device function of the wireless communication terminal in different operating system environments.

Figure 2:
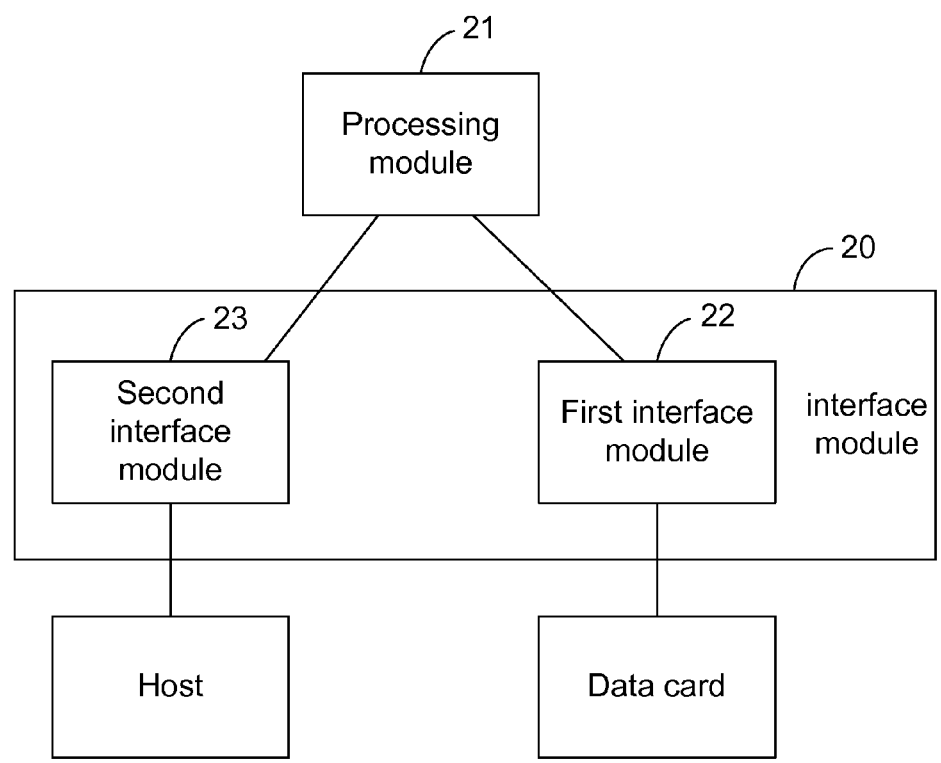
FIG. 2 is a diagram showing the structure of an apparatus for implementing a network device function of a wireless communication terminal in one embodiment of the disclosure.

FIG. 2 is a diagram showing the structure of an apparatus for implementing a network device function of a wireless communication terminal in one embodiment of the disclosure, as shown in FIG. 2, the embodiment includes:

an interface module 20 which is configured to receive and send a control instruction; and a processing module 21 which is configured to determine a sender of the control instruction received by the interface module 20; forward the received control instruction to the wireless communication terminal through the interface module 20 when the sender of the control instruction is a host; forward the received control instruction to the host through the interface module 20 when the sender of the control instruction is the wireless communication terminal.

The interface module 20 is specifically configured to receive a request message by socket, which includes the control instruction and the sender of the control instruction; and the processing module 21 is specifically configured to determine the sender of the control instruction according to the sender of the control instruction included in the request message by socket.

The interface module 20 includes:

a first interface module 22 which is configured to forward a control signalling between the processing module and the wireless communication terminal; and a second interface module 23 which is configured to forward control signalling between the processing module and the host.

The processing module 21 is further configured to encapsulate the control instruction received by the interface module 20 into a predetermined instruction format, wherein the predetermined instruction format includes but is not limited to: an instruction format in a communication-class sub-protocol in a Universal Serial Bus (USB) protocol, or an instruction format in a Qualcomm Modem Interface (QMI) specification.

The processing module 21 is specifically configured to send the encapsulated control instruction to the first interface module 22 after determining that the sender of the control instruction is the host, so that the first interface module 22 sends the encapsulated control instruction to the wireless communication terminal; and send the encapsulated control instruction to the second interface module 23 after determining that the sender of the control instruction is the wireless communication terminal, so that the second interface module 23 sends the encapsulated control instruction to the host.

The apparatus for implementing a network device function of a wireless communication terminal in the embodiment can implement the information exchange between the wireless communication terminal and a host on a non-windows platform, as a result, the problem that the network device function of the wireless communication terminal is not available on the non-windows platform is solved, and a user can freely use the network device function of the wireless communication terminal in different operating system environments.

The method for implementing a network device function of a wireless communication terminal in one embodiment of the disclosure is further described below in conjunction with the apparatus for implementing the network device function of the wireless communication terminal in one embodiment of the disclosure and with the wireless communication terminal as a data card for example.

To implement the network data exchange with a data card on a non-windows platform, the firmware (on a device side) of the data card enumerates the data card as a composite apparatus in order that the data card has a network function device interface; and the firmware maps network function interface data of the data card, such as message data and frame data, to the network function interface. Thereafter, a virtual device driver of a kernel layer of a non-windows platform is developed to connect the firmware of the data card with an application layer program of the operating system of the non-windows platform, i.e., to realize the function of the first interface module of the apparatus for implementing the network device function of the data card in one embodiment of the disclosure; an application layer daemon program for the non-windows platform is developed to run all the time to receive and send the network data and state in real time, i.e., to realize the function of the processing module of the apparatus for implementing the network device function of the data card in one embodiment of the disclosure; an application layer function library (including network connecting, network disconnecting, parameter setting, state querying and other functions) for the non-windows platform is developed to be provided to an application program on a host side to operate various interfaces of the network device, i.e., to realize the function of the second interface module of the apparatus for implementing the network device function of the data card in one embodiment of the disclosure, and the application program on the host side can operate the network device provided by the data card through the interface functions provided by the application layer function library, wherein the operation includes but is not limited to network connecting, network disconnecting, network state querying, or the like. The first interface module is a direct link between the host and the data card, by which a network device control instruction and data on the host side can be sent to the data card, and data on the data card side can also be sent to the host side at the same time, wherein these control instructions include but are not limited to the related instructions in the communication-class sub-protocol in the USB protocol, various instructions meeting the QMI specification, or the like. The processing module parses the received control instruction and encapsulates various control instructions and data, wherein these control instructions include but are not limited to the related instructions in the communication-class sub-protocol in the USB protocol, various instructions meeting the QMI specification, or the like. The instruction data from the processing module can be encapsulated through the second interface module into a packet format identifiable to the host, and provided to the application program on the host side, wherein these packet formats include but are not limited to the related instructions in the communication-class sub-protocol in the USB protocol, various instructions meeting the QMI specification, or the like; meanwhile, the data from the host is encapsulated and then provided to the processing module.

Figure 3:
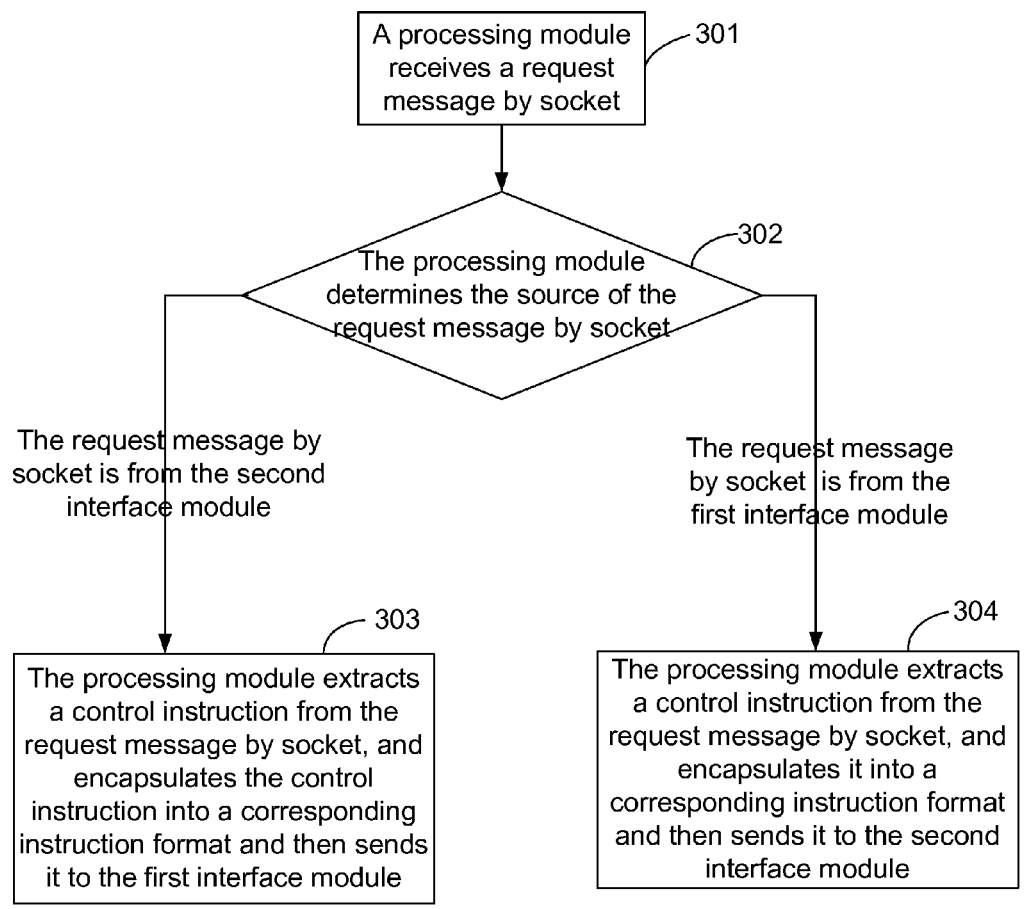
FIG. 3 is a diagram showing another flow of a method for implementing a network device function of a wireless communication terminal in one embodiment of the disclosure.

FIG. 3 is a diagram showing a flow of a method for implementing a network device function of a wireless communication terminal in one embodiment of the disclosure when the wireless communication terminal is a data card, as shown in FIG. 3, the embodiment includes:

Step 301: the processing module receives a request message by socket;

specifically, after a system on the host side boots, the processing module judges whether a request message by socket is received;

Step 302: the processing module determines the source of the request message by socket; when the request message by socket is sent from the second interface module, Step 303 is executed; and when the request message by socket is sent from the first interface module, Step 304 is executed;

when the request message by socket which includes a control instruction and a sender of the control instruction is received, the source of the request message by socket specifically can be determined based on the sender of the control instruction included in the request message by socket.

Step 303: the processing module extracts the control instruction from the request message by socket, and encapsulates the control instruction into a corresponding instruction format and then sends it to the first interface module;

when the request message by socket is from the second interface module, it indicates that the request message by socket is transmitted from the host side, which means that the host needs to send the control instruction to the data card; and the processing module extracts the control instruction from the request message by socket, encapsulates it into a corresponding instruction format which includes but is not limited to the related instructions in the communication-class sub-protocol in the USB protocol, various instructions meeting the QMI specification, or the like, and then sends the encapsulated control instruction to the first interface module in order to send it to the data card through the first interface module.

Step 304: the processing module extracts the control instruction from the request message by socket, and encapsulates it into a corresponding instruction format and then sends it to the second interface module;

when the request message by socket is sent from the first interface module, it indicates that the request message by socket is transmitted from the data card side, which means that the data card needs to send the control instruction to the host; and the processing module extracts the control instruction from the request message by socket, encapsulates it in a corresponding instruction format which includes but is not limited to the related instructions in the communication-class sub-protocol in the USB protocol, various instructions meeting the QMI specification, or the like, and then sends the encapsulated control instruction to the second interface module in order to send it to the host through the second interface module. The second interface module can also encapsulate the control instruction to facilitate the calling by the host.

How to exchange a control instruction between a host and a data card on a non-windows platform has been described in detail in the above-mentioned steps, and a data exchange between the host and the data card can be transparently implemented through the first interface module, the processing module and the second interface module directly. The apparatus for implementing the network device function of the data card in one embodiment of the disclosure can implement an information exchange between the data card and the host on the non-windows platform, as a result, the problem that the network device function of the data card is not available on the non-windows platform is solved, and a user can freely use the network device function of the data card in different operating system environments.

The method embodiment corresponds to the apparatus embodiment, and those not described in detail in the method embodiment can refer to the related description in the apparatus embodiment, vice versa.

Those skilled in the art should understand that all or part of steps implementing the method in the above-mentioned embodiments can be completed by instructing related hardware by a program; the program can be stored in a computer readable storage medium, such as a disk, a compact disc, a Read-Only Memory (ROM) or a Random Access Memory (RAM); and the execution of the program includes the steps in the above-mentioned method embodiments.

In respective method embodiments of the disclosure, the serial numbers of steps cannot be used for defining the sequence of the steps, and the change of the sequence of the steps made by those skilled in the art without creative effort shall fall within the protection scope of the disclosure.

What mentioned above are the preferred embodiments of the disclosure, and it should be explained that various improvements or modifications can also be made by those skilled in the art within the principle of the disclosure and shall fall within the protection scope of the disclosure.

The invention claimed is:

1. A method for implementing a network device function of a wireless communication terminal, comprising:
   receiving a control instruction by an apparatus for implementing the network device function of the wireless communication terminal, wherein the apparatus for implementing the network device function of the wireless communication terminal is located in a host, the host being a non-windows computing platform and wherein the control instruction is received as a request message by socket, the request message including the control instruction and a sender of the control instruction;
   parsing the received request message and determining a sender of the control instruction according to the sender included in the request message by the apparatus for implementing the network device function of the wireless communication terminal;
   when the sender of the control instruction is the host, encapsulating the received control instruction into an instruction format in a Qualcomm Modem Interface (QMI) specification and sending the encapsulated control instruction to the wireless communication terminal by the apparatus for implementing the network device function of the wireless communication terminal; and
   when the sender of the control instruction is the wireless communication terminal, encapsulating the received control instruction into the instruction format in the QMI specification and sending the encapsulated control instruction to the host by the apparatus for implementing the network device function of the wireless communication terminal.

2. The method for implementing a network device function of a wireless communication terminal according to claim 1, wherein when the sender of the control instruction is the host, sending the encapsulated control instruction to the wireless communication terminal by the apparatus for implementing the network device function of the wireless communication terminal through a first interface of the apparatus itself.

3. The method for implementing a network device function of a wireless communication terminal according to claim 1, wherein when the sender of the control instruction is the wireless communication terminal, sending the encapsulated control instruction to the host by the apparatus for implementing the network device function of the wireless communication terminal through a second interface of the apparatus itself.

4. An apparatus for implementing a network device function of a wireless communication terminal, wherein the apparatus is located in a host, the host is a non-windows computing platform, the apparatus comprising:
   a first interface module;
   a second interface module;
   a processor; and
   a memory coupled to the processor for storing a computer readable program, which when executed by the processor causes the apparatus to:
   receive a control instruction, wherein the control instruction is received either from the host via the first interface module or from the wireless communication terminal via the second interface module, and wherein the control instruction is received as a request message by socket, the request message including the control instruction and a sender of the control instruction;
   parse the received request message;
   determine a sender of the control instruction according to the sender included in the request message;
   encapsulate the received control instruction into an instruction format in a Qualcomm Modem Interface (QMI) specification and send the encapsulated control instruction to the wireless communication terminal through the first interface module when the sender of the control instruction is the host; and
   encapsulate the received control instruction into the instruction format in the QMI specification and send the encapsulated control instruction to the host through the second interface module when the sender of the control instruction is the wireless communication terminal.

5. The apparatus for implementing a network device function of a wireless communication terminal according to claim 4, wherein:
   the first interface module is used to forward control signalling between the processor and the wireless communication terminal; and
   the second interface module is used to forward control signalling between the processor and the host.

6. The apparatus for implementing a network device function of a wireless communication terminal according to claim 4, wherein
   the processor is specifically configured to send the encapsulated control instruction to the first interface module after determining that the sender of the control instruction is the host, so as to enable the first interface module to send the encapsulated control instruction to the wireless communication terminal; and send the encapsulated control instruction to the second interface module after determining that the sender of the control instruction is the wireless communication terminal, so as to enable the second interface module to send the encapsulated control instruction to the host.

* * * * *